(12) United States Patent
Pfertner et al.

(10) Patent No.: US 6,695,399 B2
(45) Date of Patent: Feb. 24, 2004

(54) MOTOR VEHICLE ROOF ARRANGEMENT

(75) Inventors: Kurt Pfertner, Ditzingen (DE); Reiner Armbruster, Muehlacker (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/233,674

(22) Filed: Sep. 4, 2002

(65) Prior Publication Data

US 2003/0062745 A1 Apr. 3, 2003

(30) Foreign Application Priority Data

Sep. 4, 2001 (DE) .......................... 101 43 265

(51) Int. Cl.$^7$ ............................................. B60J 7/22
(52) U.S. Cl. ...................................................... 296/217
(58) Field of Search ......................................... 296/217

(56) References Cited

U.S. PATENT DOCUMENTS

| 4,738,483 A | * | 4/1988 | Boots | ......................... 296/217 |
| 6,164,717 A | | 12/2000 | Haagen | ....................... 296/217 |

FOREIGN PATENT DOCUMENTS

| DE | 1149627 | | 5/1963 | |
| DE | 2338797 | | 4/1975 | |
| DE | 2505736 | * | 9/1975 | ................ 296/217 |
| DE | 2427928 | * | 12/1975 | ................ 296/217 |
| DE | 3426998 | * | 1/1986 | ................ 296/217 |
| DE | 3823316 | | 1/1990 | |
| DE | 3906903 | | 9/1990 | |
| DE | 198 26 434 | | 3/2000 | |
| DE | 10062730 | | 6/2002 | |
| EP | 385263 | * | 9/1990 | ................ 296/217 |

* cited by examiner

*Primary Examiner*—Dennis H. Pedder
(74) *Attorney, Agent, or Firm*—Crowell & Moring LLP

(57) ABSTRACT

A motor vehicle has a roof arrangement which has a sliding cover at least partially opening up and closing a roof opening, and a wind deflector device with a wind deflector blade. By way of a tilt-out lever arrangement the deflector can be displaced into an inoperative and operative position, the tilt-out lever arrangement being disposed with its first end at the vehicle in a first swivelling axis extending approximately parallel to the transverse axis of the vehicle and being connected by its second end with the wind deflector blade. During its displacement from the inoperative position into the operative position and vice-versa, the wind deflector blade is longitudinally displaceable approximately parallel to the longitudinal axis of the vehicle, In addition, the wind deflector blade is connected by way of a second swivelling axis extending parallel to the transverse axis of the vehicle with the second end of the tilt-out lever arrangement, and can be restrictedly swivelled about this second swivelling axis by a control path. This arrangement reduces the space requirement of the wind deflector device in the inoperative position.

14 Claims, 2 Drawing Sheets

MOTOR VEHICLE ROOF ARRANGEMENT

BACKGROUND AND SUMMARY OF THE INVENTION

This application claims the priority of German Application No. 101 43 265.8 filed Sep. 4, 2001, the disclosure of which is expressly incorporated by reference herein.

The invention is based on a motor vehicle with a roof arrangement, which has a sliding cover at least partially opening up and closing a roof opening, and a wind deflector device which comprises a wind deflector blade which, by way of a tilt-out lever arrangement can be displaced into an inoperative and operative position, the tilt-out lever arrangement being disposed by its first end at the vehicle in a first swivelling axis extending approximately parallel to a transverse axis of the vehicle and being connected by its second end with the wind deflector blade.

From German Patent Document DE 198 26 434 C1 (corresponding U.S. Pat. No. 6,164,717), a motor vehicle of the above-mentioned type is known which has a roof arrangement comprising a sliding cover, which at least partially opens up and closes a roof opening, as well as a wind deflector device having a wind deflector blade and a tilt-out lever arrangement. By way of the tilt-out lever arrangement, the wind deflector blade can be displaced into an inoperative and operative position, the tilt-out lever arrangement being disposed with its first end in a first swivelling axis extending approximately parallel to the transverse axis of the vehicle at the body of the vehicle and being connected with its second end with the wind deflector blade. In its inoperative position, the wind deflector blade is situated below the level of the fixed exterior roof skin. In the operative position, the wind deflector blade projects beyond the exterior roof skin. In the case of this vehicle, the relatively large space requirement of the wind deflector arrangement in the inoperative position is a disadvantage.

It is therefore an object of the invention to provide a motor vehicle of the initially mentioned type, in which the space requirement of the wind deflector device is reduced in the inoperative position or, when sufficient space is available for the wind deflector device, this wind deflector device can be deposited in the inoperative position.

This object is achieved by means of a motor vehicle of the above noted type, wherein during displacement of the wind deflector blade from an inoperative position into an operative position and vice-versa, the wind deflector blade is longitudinally displaceable approximately parallel to a longitudinal axis of the vehicle, wherein the wind deflector blade is connected by way of a second swivelling axis extending parallel to the transverse axis of the vehicle with a second end of the tilt-out lever arrangement, and wherein the wind deflector blade can be restrictedly swivelled about this second swivelling axis by a control path. Additional advantageous characteristics further developing the invention are described below and in the claims.

Important advantages achieved by means of the invention include the feature that, when it is displaced into the inoperative position, the wind deflector blade is moved about the second swivelling axis and in the longitudinal direction and can be guided through in this manner under a roof frame surrounding the roof opening, whereby its space requirement in the inoperative position is optimized. In addition, during the longitudinal displacement of the wind deflector blade, the superimposing of the movement is possible about the second swivelling axis, so that the wind deflector blade can be moved through under the roof frame in an essentially horizontal position and can therefore be displaced under the exterior roof skin and in the direction of the windshield frame of the vehicle. After having been moved through under the frame, it can be swivelled back about the second swivelling axis by the restricted swivelling and in the process can be brought into an essentially upright position. The space required in the longitudinal direction of the vehicle is therefore further reduced.

According to an advantageous feature of certain preferred embodiments of the invention, the swivelling movement of the tilt-out lever arrangement about the first swivelling axis, like the swivelling movement of the wind deflector blade about the second swivelling axis, is restrictedly controlled; that is, the movement sequence of the wind deflector device is fixedly coupled with the movement of the sliding cover or takes place as a function of the sliding position of the cover. The restricted control of the swivelling movements is achieved particularly advantageously by way of the control track and curved track respectively acting upon the wind deflector blade and the tilt-out lever arrangement respectively.

According to an advantageous feature of certain preferred embodiments of the invention, for the longitudinal displacement of the wind deflector blade, a drive-type catch is provided on the sliding cover, which drive-type catch, during a closing movement of the sliding cover, takes along the wind deflector blade in the longitudinal direction of the vehicle and thus the wind deflector blade can be moved through under the roof frame.

Furthermore, according to an advantageous feature of certain preferred embodiments of the invention, for the longitudinal displaceability of the wind deflector blade, it is provided to equip the tilt-out lever arrangement with sectional levers which can be telescopically slid in one another. When the wind deflector blade is taken along by the drive-type catch, the sectional levers are telescoped out, whereby the length of the tilt-out lever arrangement is enlarged which causes the longitudinal displaceability. As an alternative or in addition, the tilt-out lever arrangement may be disposed displaceably in the longitudinal direction by means of its first end on the vehicle body or module frame.

According to an advantageous feature of certain preferred embodiments of the invention, the swivelling movement of the tilt-out lever arrangement is restrictedly controlled such that the latter carries out an up-and-down movement which promotes the moving-through of the wind deflector blade under the roof frame.

Other objects, advantages and novel features of the present invention will become apparent from the following detailed description of the invention when considered in conjunction with the accompanying drawings.

DETAILED DESCRIPTION OF THE DRAWINGS

Figure 1:
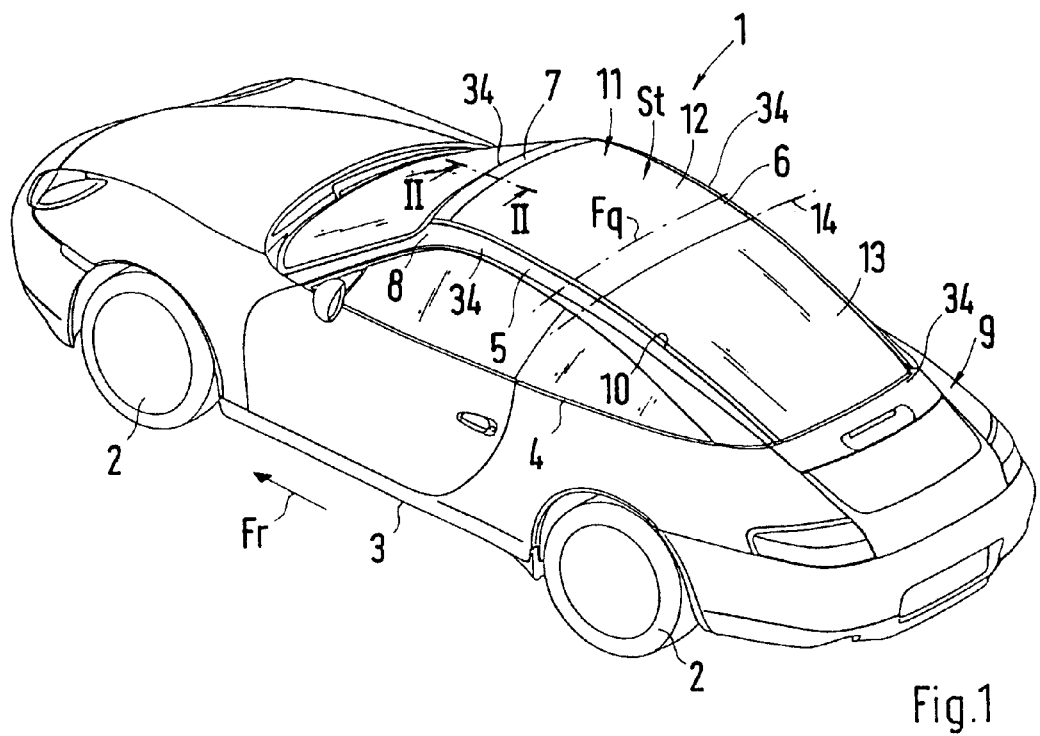
FIG. 1 is a perspective view of a motor vehicle with a roof arrangement constructed according to a preferred embodiment of the present invention.

FIG. 1 illustrates a motor vehicle 1, particularly a passenger car, having a vehicle body 3 which is carried by wheels 2 and which has roof side members 5 and 6 bridging over a belt line 4, which roof side members 5 and 6 extend in a curved manner from a cross part 7 of a windshield frame 8 to into a rear area 9 of the vehicle 1, so that the vehicle body 3 has the shape for a coupe with a fast back. Between the roof side members 5 and 6 and the cross part 7 as well as the rear area 9, a roof opening 10 is constructed into which a roof arrangement 11 is inserted which has at least a forward sliding cover 12 and, for example, an additional rearward cover 13, in which case the sliding cover can at least partially open up and close the roof opening 10. For this purpose, the sliding cover 12 can be displaced under the rearward cover 13. The rearward cover 13, in contrast, is constructed, for example, as a tail gate and can be moved against the driving direction Fr about a folding axis 14. As an alternative, the rearward cover can be assigned to the vehicle body 3, so that the roof arrangement 11 comprises only the at least one sliding cover 12. It is also contemplated to displaceably arrange the sliding cover 12 in a cutout of a fixed exterior roof skin. However, the roof arrangement 11 illustrated in FIG. 1 is preferable in which the sliding cover 12 reaches to the roof side members 5 and 6.

The roof arrangement 11 with the covers 12 and 13 is preferably constructed as a prefabricated roof module and has a surrounding module frame 15. It is inserted, for example, through the opening surrounded by the windshield frame 8 into the vehicle interior 16 and is then placed from below against the roof side members 5 and 6, the cross part 7 and the rear area 9 and is connected with the vehicle body 3, as illustrated in a cutout with respect to the cross part 7 in FIG. 2. The sliding cover 12 is displaceably guided on the module frame 15 and the rearward cover 13 is swivellably linked to the module frame 15.

Figure 3:
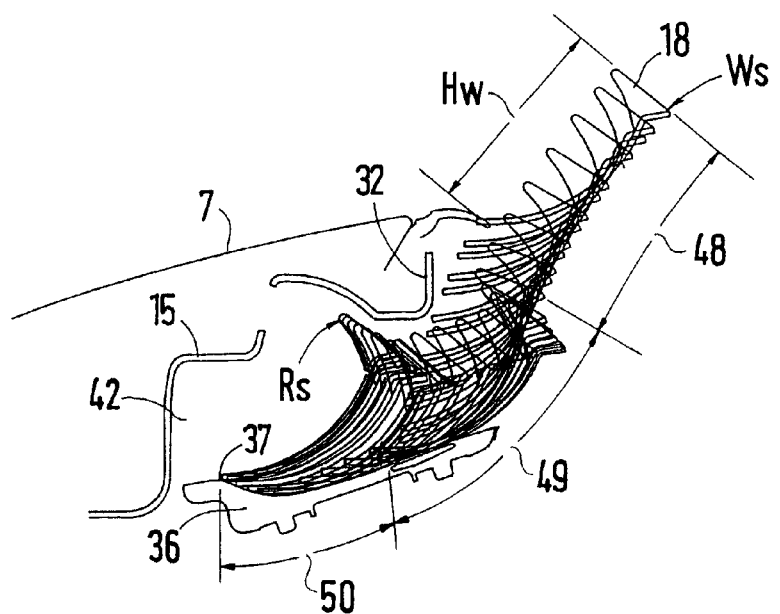
FIG. 3 is a view of the sequence of movements of a wind deflector blade of the roof arrangement of FIGS. 1 and 2.

The roof arrangement 11 also comprises a wind deflector device 17, which is shown in FIG. 3 in its inoperative or moved-in position Rs in which it comes to be situated below the fixed exterior roof skin, for example, the cross part 7. The wind deflector device 17 has a wind deflector blade 18 and a tilt-out lever arrangement 19 for the wind deflector blade 18. The tilt-out lever arrangement 19 is fixedly mounted on the vehicle body 3 or on the module frame 15 but is disposed by means of its first end 20 in a first swivelling axis 21 which extends approximately parallel to a transverse vehicle axis Fq (FIG. 1). By means of its second end 22, the tilt-out lever arrangement 19 is connected in a second swivelling axis 23 extending approximately parallel to the transverse vehicle axis Fq with the wind deflector blade 18. In addition, the tilt-out lever arrangement 19 comprises at least two sectional levers 24 and 25 which can be telescoped in one another so that the wind deflector blade is longitudinally displaceably (arrow Ls) guided approximately parallel to the longitudinal vehicle axis Fl. The swivelling movements about the swivelling axes 21 and 23 as well as the longitudinal displaceability Ls of the wind deflector blade 18 are preferably restrictedly controlled, which means that the displacement of the wind deflector device 17 out of its inoperative position Rs into the operative position Ws indicated in FIG. 3, is coupled to the sliding movement of the sliding cover 12 or directly controlled by the sliding cover 12. In the operative position Ws the wind deflector blade 18 projects over the exterior roof skin, for example, the cross part 7.

For the restricted control of the tilt-out lever arrangement 19 about the first swivelling axis 21, a curved path 26 is provided on the underside 27 of the sliding cover 12, particularly on its cover frame 28. The curved path 26 acts directly upon the tilt-out lever arrangement 19 on which a cam 29 is constructed for this purpose. The curved path 26 has at least one wave trough 30 as well as a wave crest 31, in which case—viewed in the driving direction Fr—the wave trough 30 is situated in front of the wave crest 31. During a sliding cover movement in the longitudinal direction Ls, the tilt-out lever arrangement 19 is moved about its first swivelling axis 21 alternatingly clockwise and counterclockwise (double arrow D1), in which case the length and position of the wave trough 30 and of the wave crest 31 are selected such that the wave trough 30 will have an effect when the wind deflector blade 18 is to be guided through under a bearing 32 for a cover seal 33a or 33b, in which case this bearing 32 is arranged on the module frame 15 or on a roof frame 34 forming a portion of the vehicle body 3, which roof frame 34 surrounds the opening 10. For the tilt-out movement of the tilt-out lever arrangement 19 clockwise about the first swivelling axis 21, the tilt-out lever arrangement is acted upon by a first spring 35 and is thereby pushed against the curved path 26 or into the operative position Ws. The spring 35 is constructed, for example, as a leaf spring which is fixed by means of its one end to the module frame and by means of its other end presses against the tilt-out lever arrangement 19.

For the restricted controlling of the wind deflector blade 18 about the second swivelling axis 23, a control path 36 is provided on the frame 15, which control path 36 interacts with the free end 37 of the wind deflector blade 18 and thus restrictedly controls this wind deflector blade 18—depending on whether it is displaced in the operative or inoperative position—clockwise or counterclockwise (double arrow D2). The control path 36 essentially has a descending section 38 and an ascending section 39, the ascending section 39—viewed in the driving direction Fr—being situated in front of the descending section 38. For the swivelling movement of the wind deflector blade 18 counterclockwise, a second spring 40 is provided which may be constructed, for example, as a leg spring placed about the swivelling axis 23, which leg spring may rest by means of its one leg on the tilt-out lever arrangement 19 and, by means of its other leg, on the wind deflector blade 18. This ensures that the free end 37 rests in a spring-loaded manner on the control path 36 and that, in addition, the wind deflector blade 18 takes up its approximately upright position which it has in the operative position Ws.

For the restricted controlling of the longitudinal displaceability Ls of the wind deflector blade 18, a drive-type catch 41 is constructed on the underside 27 of the sliding cover 12, particularly on its cover fame 28, which drive-type catch 41 pushes the wind deflector blade 18 into its receiving space 42 in the driving direction Fr, which receiving space 42 is situated under the cross part 7 or under the exterior roof skin, in which case the receiving space 42 is preferably situated in the module frame 15. When, during a closing movement (in the driving direction Fr) of the cover 12, the drive-type catch 41 impacts on the wind deflector blade 18, the tilt-out lever arrangement 19 is lengthened by the telescopic spreading-apart of the sectional levers 24 and 25, whereby the wind deflector blade 18 is displaced into its receiving space 42. During this spreading-apart of the sectional levers 24 and 25, these are mutually acted upon by force by way of a third spring 43 so that the spring 43 is tensioned or compressed. The spring 43 is arranged in the sectional lever 24 and rests therein against a holding collar 44. In addition, another sectional lever 25 reaches through the spring 43, which sectional lever 25 has a spring washer 46 at its reaching-through end 45, whereby the spring 43, which is implemented as a coil spring, can be prestressed between the holding collar 44 and the spring washer 46.

On the whole, for the restricted controlling of the wind deflector device 17 from the inoperative position Rs into the operative position Ws, a spring control is exhibited by the springs 35, 40 and 43 and, from the operative position Ws into the inoperative position Rs, a movement control is exhibited by the curved path 26, the control path 36 and the drive-type catch 41 against the spring forces.

Figure 2:
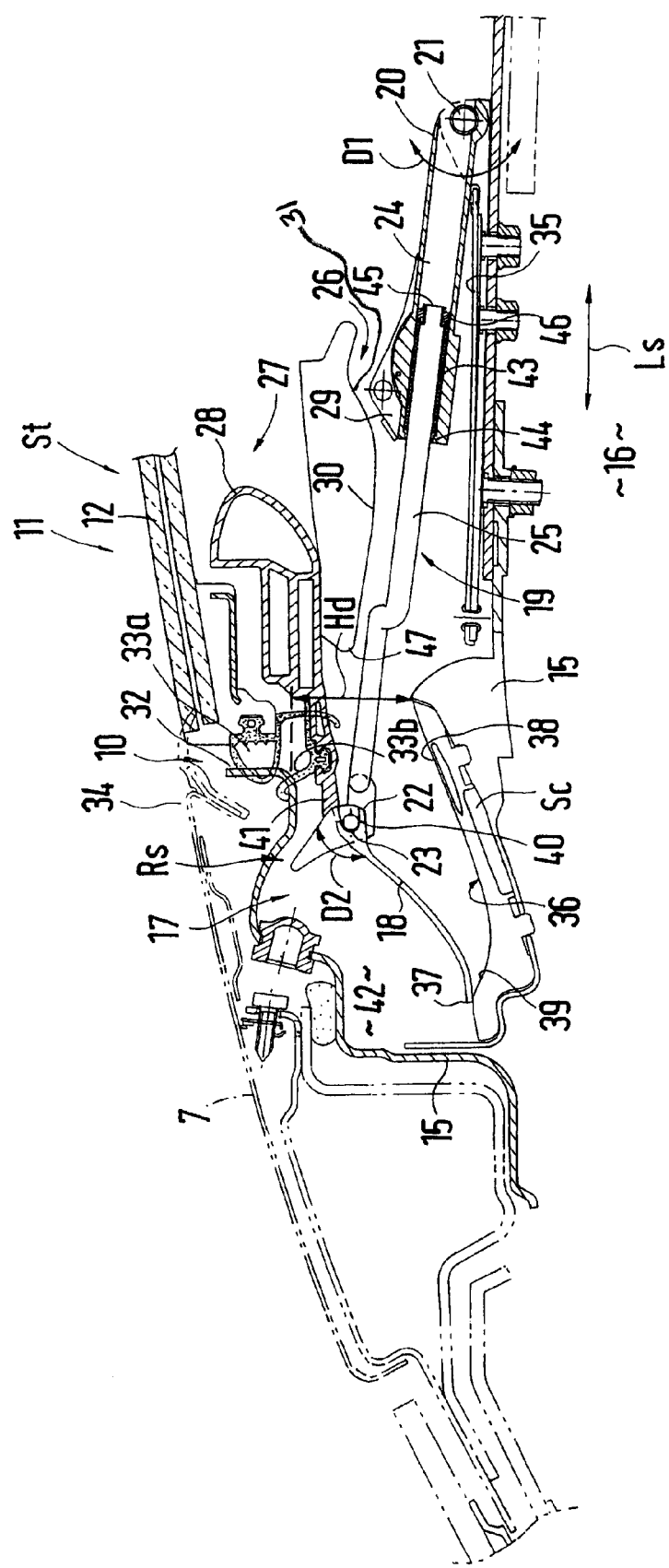
FIG. 2 is a sectional view along Line II—II of the roof arrangement of FIG. 1.

Purely as an example, FIG. 3 shows with reference to FIG. 2 the sequence of movements of the wind deflector device 17 or of the wind deflector blade 18 from the operative position Ws into the inoperative position Rs: Starting from the position of the sliding cover 12 which is an at least partially opened-up position, in which position the wind deflector device 17 is released by the sliding cover 12 and is in the moving-out or operative position Ws, as indicated in FIG. 3, during a closing of the sliding cover 12 in the driving direction Fr, the curved projection 47 of the curved path 26 arranged in front of the wave trough 30 will first impact on the cam 29 and, during a continued closing movement of the cover 12, the wave trough 30 will act upon the cam 29, whereby the tilt-out lever arrangement 19 is moved counterclockwise about the first swivelling axis 21 into a first swivelling range 48. The first swivelling range 48 is followed by a first movement superimposing range 49 in which the wind deflector blade 18 is moved clockwise about its second swivelling axis 23 because the free end 37 of the wind deflector blade 18 impacts on the control path 36, and in which the drive-type catch 41 impacts on the wind deflector blade 18 and moves the blade 18 along in the driving direction Fr for the longitudinal displacement Ls. In the movement superimposing range 49, the swivelling movement about the second swivelling axis 23 and the longitudinal displacement Ls are therefore superimposed, specifically such that, during the longitudinal displacement Ls, the wind deflector blade 18 is moved so far into an approximately horizontal position in which the blade 18 is moved between the sealing bearing 32 and the leg Sc of the module frame 15, which leg Sc carries the control path 36, into its receiving space 42. Measured between the sealing bearing 32 and the leg Sc, the opening height Hd of the receiving space 42 can therefore be less than the height Hw of the wind deflector blade 18.

The first movement superimposing range 49 is followed by a second movement superimposing range 50, in which, in addition to the superimposing movement from the first superimposing range 49, another swivelling movement of the tilt-out lever arrangement 19 is carried out clockwise about the first swivelling axis 21, because only the wave crest 31 of the curved path 26 acts upon the cam 29. In the second movement superimposing range 50, the wind deflector blade 18 is moved completely into its receiving space 42 in which it takes up its inoperative position Rs. When the sliding cover 12 is at least partially opened up from its closed position St illustrated in FIG. 2, for example, is lowered in the direction of the vehicle interior 16, and is subsequently displaced against the driving direction Fr, the sequence of movements of the wind deflector blade 18 illustrated in FIG. 3 will take place in the reverse sequence.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle with a roof arrangement which has a sliding cover at least partially opening up and closing a roof opening, and a wind deflector device which comprises a wind deflector blade which, by way of a tilt-out lever arrangement can be displaced into an inoperative and operative position, the tilt-out lever arrangement being disposed by its first end at the vehicle in a first swivelling axis extending approximately parallel to a transverse axis of the vehicle and being connected by its second end with the wind deflector blade, wherein, during displacement of the wind deflector blade from an inoperative position into an operative position and vice-versa, the wind deflector blade is longitudinally displaceable approximately parallel to a longitudinal axis of the vehicle via the tilt-out lever arrangement, wherein the wind deflector blade is connected by way of a second swivelling axis extending parallel to the transverse axis of the vehicle with a second end of the tilt-out lever arrangement, and wherein the wind deflector blade can be restrictedly swivelled about this second swivelling axis by a control path.

2. Motor vehicle according to claim 1, wherein a curved path is arranged on the sliding cover for restricted control of the tilt-out lever arrangement about the first swivelling axis.

3. Motor vehicle according to claim 1, comprising a drive-type catch arranged at the sliding cover for the wind deflector blade, which drive-type catch displaces the wind deflector blade during its displacement from the operative position into the inoperative position approximately parallel to the longitudinal axis of the vehicle.

4. Motor vehicle according to claim 1, wherein the control path is arranged on a frame mounted adjacent to the roof opening.

5. Motor vehicle according to claim 1, wherein the tilt-out lever arrangement for the longitudinal displaceability of the wind deflector blade has two sectional levers which can be telescopically slid into one another.

6. Motor vehicle according to claim 2, wherein the tilt-out lever arrangement is loaded about the first swivelling axis by a first spring, and abuts against the curved path.

7. Motor vehicle according to claim 6, wherein the wind deflector blade is loaded about the second swivelling axis by means of a second spring with respect to the tilt-out lever arrangement.

8. Motor vehicle according to claim 5, wherein the two sectional levers are loaded with respect to one another by means of a sectional lever spring.

9. Motor vehicle according to claim 2, wherein the curved path has a wave shape with at least one wave trough and a wave crest, the wave trough being arranged in front of the wave crest and as viewed in the driving direction.

10. A vehicle roof assembly comprising:

a wind deflector blade, and a wind deflector blade support assembly which accommodates movement of the wind deflector blade between a storage position inside a vehicle adjacent a selectively closeable roof opening and an operative position protruding above the roof opening, wherein said wind deflector blade support assembly includes means for guiding the wind deflector blade as it moves between the storage position and operative position such that a vertical height of the wind deflector blade is reduced as compared to its vertical height when in the operative position during a portion of its travel path between the storage and operative positions to thereby optimize available space in a vehicle.

11. A vehicle roof assembly comprising:

a vehicle roof having an upwardly open roof opening, a movable cover operable to selectively open and close said roof opening, a wind deflector blade, a tilt out lever assembly including respective telescoping lever sections and having a first pivotal connection with a vehicle part at a first of the tilt out lever assembly sections and a second pivotal connection with the wind deflector assembly at a second part of the tilt out lever assembly sections, a cover control surface movable with the cover and engageable with the tilt out lever assembly to control pivoting movement of the tilt out lever assembly about the first pivotal connection, and a vehicle fixed control surface engageable with the wind deflector blade to control pivotal movement of the wind deflector blade about the second pivotal connection.

12. A vehicle roof assembly according to claim 11, further comprising:

a drive catch member movable with the cover and abuttingly engageable with a portion of the wind deflector blade which extends at a side of the second pivotal connection opposite the vehicle fixed control surface to further control movement to the wind deflector blade as a function of movement of the cover.

13. A wind deflector assembly for use with a vehicle roof assembly comprising a vehicle roof having an upwardly open roof opening, and a movable cover operable to selectively open and close said roof opening, said deflector assembly comprising:

a wind deflector blade, a tilt out lever assembly including respective telescoping lever sections and having a first pivotal connection connectible with a vehicle part at a first of the tilt out lever assembly sections and a second pivotal connection with the wind deflector assembly at a second part of the tilt out lever assembly sections, a cover control surface movable with the cover and engageable with the tilt out lever assembly to control pivoting movement of the tilt out lever assembly about the first pivotal connection, and a vehicle fixed control surface engageable with the wind deflector blade to control pivotal movement of the wind deflector blade about the second pivotal connection.

14. A wind deflector assembly according to claim 13, further comprising:

a drive catch member movable with the cover and abuttingly engageable with a portion of the wind deflector blade which extends at a side of the second pivotal connection opposite the vehicle fixed control surface to further control movement to the wind deflector blade as a function of movement of the cover.

* * * * *